(12) United States Patent
Vaucher

(10) Patent No.: US 10,916,229 B2
(45) Date of Patent: Feb. 9, 2021

(54) BEAT DECOMPOSITION TO FACILITATE AUTOMATIC VIDEO EDITING

(71) Applicant: SoClip!, Bandol (FR)

(72) Inventor: Christophe Vaucher, Bandol (FR)

(73) Assignee: SOCLIP!, Bandol (FR)

( * ) Notice: Subject to any disclaimer, the term of this patent is extended or adjusted under 35 U.S.C. 154(b) by 0 days.

(21) Appl. No.: 16/503,379

(22) Filed: Jul. 3, 2019

(65) Prior Publication Data

US 2020/0013379 A1  Jan. 9, 2020

Related U.S. Application Data

(60) Provisional application No. 62/693,799, filed on Jul. 3, 2018.

(51) Int. Cl.
*G10H 1/00* (2006.01)
*G11B 27/031* (2006.01)

(52) U.S. Cl.
CPC ......... *G10H 1/0008* (2013.01); *G11B 27/031* (2013.01); *G10H 2210/051* (2013.01); *G10H 2210/056* (2013.01); *G10H 2210/076* (2013.01); *G10H 2220/116* (2013.01)

(58) Field of Classification Search
CPC .......... G10H 1/0008; G10H 2210/051; G10H 2210/056; G10H 2210/076; G10H 2220/116; G11B 27/031
See application file for complete search history.

(56) References Cited

U.S. PATENT DOCUMENTS

| | | | | |
|---|---|---|---|---|
| 6,463,014 | B1* | 10/2002 | Kanou | G11B 20/10527 369/5 |
| 8,420,921 | B2* | 4/2013 | Kobayashi | G10H 1/40 84/613 |
| 10,043,530 | B1* | 8/2018 | Shi | H04R 3/00 |
| 2009/0150781 | A1* | 6/2009 | Iampietro | G11B 27/10 715/716 |
| 2010/0211200 | A1* | 8/2010 | Kobayashi | G06F 3/165 700/94 |
| 2010/0257994 | A1* | 10/2010 | Hufford | G10H 1/0025 84/609 |
| 2011/0067555 | A1* | 3/2011 | Sugai | G10H 1/40 84/612 |
| 2014/0123836 | A1* | 5/2014 | Vorobyev | G10H 1/0008 84/616 |
| 2014/0366710 | A1* | 12/2014 | Eronen | G10H 1/00 84/609 |
| 2016/0005387 | A1* | 1/2016 | Eronen | G10H 1/40 84/611 |
| 2016/0027420 | A1* | 1/2016 | Eronen | G10H 1/383 84/611 |
| 2017/0092320 | A1* | 3/2017 | Gehring | G11B 27/34 |

* cited by examiner

*Primary Examiner* — Jeffrey Donels
(74) *Attorney, Agent, or Firm* — Polsinelli PC

(57) ABSTRACT

The disclosed technology relates to a process for detecting musical artifacts within a musical composition. The detection of musical artifacts is based on analyzing the energy and frequency of the digital signal of the musical composition. The identification of musical artifacts within a musical composition would be used in connection with audio-video editing.

18 Claims, 9 Drawing Sheets

BEAT DECOMPOSITION TO FACILITATE AUTOMATIC VIDEO EDITING

CROSS-REFERENCE TO RELATED APPLICATIONS

This application claims the benefit of U.S. provisional application No.: 62/693,799 filed on Jul. 3, 2018 and entitled "BEAT DECOMPOSITION TO FACILITATE AUTOMATIC VIDEO EDITING", which is incorporated by reference in its entirety.

BACKGROUND

1. Technical Field

The subject matter of this disclosure generally relates to video editing and in particular, to systems and methods for performing beat decomposition to facilitate beat matching.

2. Introduction

When properly applied, musical scores that are paired with visual content, such as images or videos, can result in emotionally powerful multimedia productions. However, for such content to carry emotional force, musical and visual transitions must occur in careful synchrony, such that visual effects are well matched with musical transitions. This process, sometimes known by content editors as "beat matching," is a typically difficult, time consuming, manual process. That is, conventional video editing usually requires beat matching to be performed by an editing expert, making the production of professional content difficult or unavailable to the average consumer. However, with the continued proliferation of mobile devices, such as video capable smart phones and the proliferation of social media, there is an increasing desire by consumers to generate and share their own mixed content productions.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DETAILED DESCRIPTION

Figure 1:
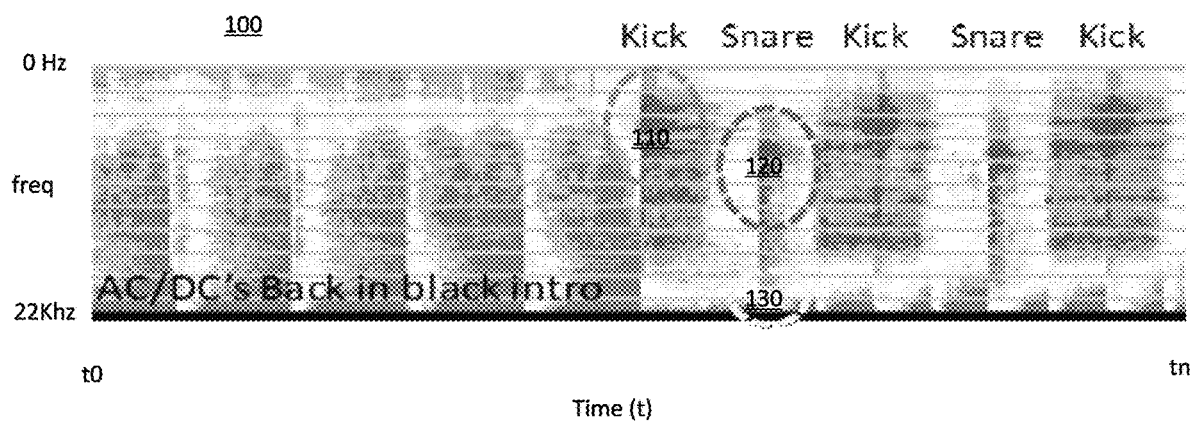
FIG. 1 conceptually illustrates an example identification of musical artifacts within a musical composition.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Disclosed herein are computer-implemented methods, computer-readable media, and systems for identifying musical artifacts. The identification of musical artifacts is performed by first receiving a primary waveform representing a musical composition that has musical artifacts. The primary waveform is then filtered to generate alternative waveforms associated with the musical artifacts. The alternative waveforms are then analyzed to identify time points within the primary waveform that correspond to musical artifacts.

In some embodiments, the filtering of the primary waveform includes a first filtering that uses two or more interlaced band pass filters and outputs two or more secondary waveforms. The first filtering includes calculating samples' module for the secondary waveforms, identifying samples' modules that exceed a first predetermined frequency range threshold, identifying frequency ranges for each of the musical artifacts that have a most samples' module that exceeds the first predetermined frequency range threshold, and identifying a preliminary list of musical artifacts that are based on the most samples' module from the secondary waveforms that exceed the first predetermined frequency range.

In another embodiment, the filtering of the primary waveform includes a second filtering process of the primary waveform using either a low-pass filter or a resampling process that outputs a tertiary waveform. The second filter process includes calculating a tertiary waveform samples' module moving average for each musical artifact frequency range and identifying for each of the musical artifacts at least one of samples' module moving average that exceeds a second predetermined frequency range threshold. The second filtering process then identifies a secondary list of musical artifacts that includes musical artifacts of the preliminary list, wherein the secondary list of musical artifacts includes the musical artifacts that have the samples' module moving average exceeding the second predetermined frequency range threshold at the time points within a range of t with respect to the time points of the musical artifacts included on the preliminary list.

In a further embodiment, the filtering of the primary waveform also includes third filtering of the primary waveform using a high-pass filter that outputs a quaternary waveform. The third filtering process includes identifying samples' modules of the quaternary waveform that exceed a third predetermined second frequency range threshold and identifying a tertiary list of musical artifacts that includes the musical artifacts of the secondary list. The tertiary list of musical artifacts includes the musical artifacts that have the samples' module of the quaternary waveform exceeding the third predetermined frequency range threshold within a range of t with respect to the time points of the musical artifacts included on the secondary list.

Example Embodiments

As described herein, the present description addresses the foregoing limitations of conventional (manual) beat matching approaches by providing methods, systems and software for performing automatic beat matching. As discussed in further detail below, automatic beat matching can be used to facilitate the automatic editing of visual media content (e.g., images and videos), by mixing such content with various musical selections or compositions.

In some aspects, beat matching is performed by identifying high-energy musical artifacts, for example, that correspond with sharp musical transitions in a musical composition (song). The timing of such transitions, with respect to the associated song, can be recorded, e.g., to generate an output file indicating the time locations (or time points) of transitions (e.g., "hits") in the song's duration, as well as time segments (or song sections) that contain no such artifacts (e.g., "no-hit" sections). As discussed in further detail below, the resulting hit/no-hit file (sometimes represented as a vector), can be used to indicate cut opportunities in the visual content i.e., locations where visual transitions can be made to pair with a corresponding musical selection.

As described herein, musical artifacts are identifiable based on certain frequency and energy characteristics. Although this disclosure provides representative examples with respect to the identification of drum beats specifically (i.e., kick, snare and charlies), the identification of other types of musical artifacts is contemplated By identifying these musical artifacts, the identifiable characteristics about the musical composition can be used in connection with an automated audio-video editing process in order to automate the process for producing a mixed-media output of professional quality. In particular, the disclosed technology is used in connection with beat matching algorithms in order to automate a matching between an audio input file (e.g. musical composition) and scene transitions of a video file. The edits made to the video file are made in connection with the identifiable characteristics about the audio input file for corresponding video inputs. This allows anyone (even users without extensive audio-video editing experience) to produce a high-quality mixed media output where scene transitions and other effects can be automatically implemented based on an accompanying audio input file (e.g. musical composition). Details regarding the automated audio-video edits that can be made using the identified musical artifacts of the musical composition are incorporated by reference and described within U.S. provisional application 62/837,122 filed on Apr. 22, 2019 entitled "Music-based Video Editing." Further details about how to identify musical artifacts in an audio input file (e.g. musical composition) will be described below.

Aspects of the disclosed technology described below will address the limitations of conventional (manual) beat matching procedures by providing an improved process for automatically identifying musical artifacts (e.g. drum beats) within a musical composition. By improving the automated process for identifying the musical artifacts, the present technology facilitates automated video mixing by using the identified musical artifacts and their time location (also referred to as time points) within the musical composition in order to implement video edits. The synchronization between the time location of the musical artifact within the musical composition and the corresponding visual effect/scene transition that is applied within video editing improves the quality of the video.

The present disclosure describes a process that analyzes musical compositions based on different thresholds associated with both frequency and energy in order to identify musical artifacts within the musical composition. In some aspects, the identification of musical artifacts may be performed to identify specific drum types such as a bass drum (e.g. kick) or snare drum. However, it is understood that the present disclosure describing the analysis of the musical composition used to identify the musical artifacts is not limited to the types of musical artifacts described in the various embodiments below. For example, other musical characteristics could also be identified within the musical composition including one or more of the following: a floor tom, hanging/rack toms, a hi-hat, a crash cymbal, a ride cymbal, a splash cymbal, and/or a china cymbal, or the like.

As described in further detail below, musical artifacts within the musical composition can be identified based on frequency and energy. For example, certain types of musical artifacts (e.g. drum beats) are identified by their relatively high salience (energy) and relatively short duration (e.g., 10 ms). Drum beats may be distinguishable characteristics exhibited from other instruments, such as guitar and piano, which typically exhibit lower energy characteristics and longer durations. In another example, musical artifacts may also be identified based on frequency. Certain types of musical artifacts (e.g. drum beats) may have a single and constant resonance frequency which is based on the geometry of the drum itself.

FIG. 1 conceptually illustrates an example identification of musical artifacts within a musical composition (e.g., a song). The figure is a graph 100 illustrating an energy characterization of the musical composition (in this case, AC/DC's Back in Black introduction). In particular, frequencies (ranging from 0 Hz to 22 kHz) of an audio signal are graphically illustrated with respect to time.

The graph also illustrates different musical artifacts (e.g. elements 110-130) illustrated at specific time locations within the musical composition where the musical composition exhibits various different peaks in energy. The musical artifacts (for example, a drum beats) exist at specific points in time within the musical composition. Depending on the desired implementation, the musical artifacts may be identified based on different frequency and/or energy characteristics. By way of example, musical artifact identification may be based on a determination of whether or not the musical artifact has 1) energy above a pre-determined threshold that occurs within a pre-determined period of time (e.g. a few milliseconds) and/or 2) a resonating frequency where most of the energy is concentrated.

As illustrated in the figure, musical artifacts 110 and 120 are two different points within the graph 100 of the energy characterization of the musical composition that correspond to different musical artifacts that can be detected using the present technology. Each of the musical artifacts 110 and 120 has an energy level that is above the pre-determined minimum threshold. The graph 100 illustrating the energy characterization shows that the musical artifacts 110 and 120 have their respective highest energy peaks at different points in time within the musical composition.

Musical artifacts, such as drum beats, may be characterized with energy above a first threshold that lasts for a pre-determined period of time. Furthermore, the musical artifact would have an average energy level (based on a few tens of subsequent samples or samples' module) that is above a second threshold. The first and second thresholds used to identify energy and average energy for a musical artifact may be customized based on, for example, the characteristics of the musical composition as well as each of the musical artifacts being detected. The customization may be performed, for example, by a user of the present technology. Another factor for customizing the first and second thresholds may also be based on the instruments (e.g. type of drums) used in connection with the musical artifact (e.g. drum beat) being detected.

Furthermore, each of the musical artifacts 110 and 120 are associated with peak energy concentrated around different frequencies. It may be possible to specifically identify the type of musical artifact within the graph 100 of the energy characterization of the musical composition based on what frequency the peak energy of the audio signal is concentrated around. For example, a musical artifact having the peak energy concentrated around 60-70 Hz may correspond with a kick 110. In contrast, if the peak energy of a musical artifact is concentrated around 130-150 Hz, this may be indicative that the musical artifact is a snare drum 120.

Different musical artifacts would have different concentrated frequency ranges where their peak energy is located. However, these frequency ranges for the different musical artifacts do not overlap so that the present technology would be able to distinguish between the different musical artifacts. For example, the threshold frequency range for kicks 110 can be as wide as 40-100 Hz. In contrast, the threshold frequency range used to detect snare drums 130 can be as wide as 110-170 Hz. Other frequency ranges would be assigned to other musical artifacts that would be different from the ones described above for kicks and snare drums.

As described above, musical artifacts 110 and 120 (e.g. drum beats) have energy above the first threshold (e.g. high frequency range). The graph 100 of the energy characterization of the musical composition shows musical artifacts 110 (e.g. kick) and 120 (e.g. snare drum) each having energy at a high frequency range 130. The high frequency range 130 represents that a musical artifact has energy at a high frequency. The high frequency range 130 is used as an initial determination (or "gate") to identify that a musical artifact potentially exists at the point in time within the musical composition. The initial determination associated with the high frequency range 130 is also referred to as "Zone-O." Although the presence of the "gate" at the high frequency range 130 is used to identify a time location within the musical composition of where a musical artifact can be located, the presence of the "gate" at the high frequency range 130 does not necessarily mean that a musical artifact exists. It is possible that despite energy being located at the high frequency range 130, a determination that no musical artifact is still possible. However, the lack of the "gate" at the high frequency range 130 at a point in time of the musical composition does conclude that a musical artifact 110, 120 (for example, a drum beat such as a kick or snare drum) is not present at a particular time within the musical composition.

In order to obtain the energy and frequencies associated with a musical composition, the musical composition is processed so that it can be converted from an audio format into a digital format (also referred to as a primary waveform) that can be analyzed. As described herein, audio input files are converted into a .wav file (although other formats are also possible).

Figure 2:
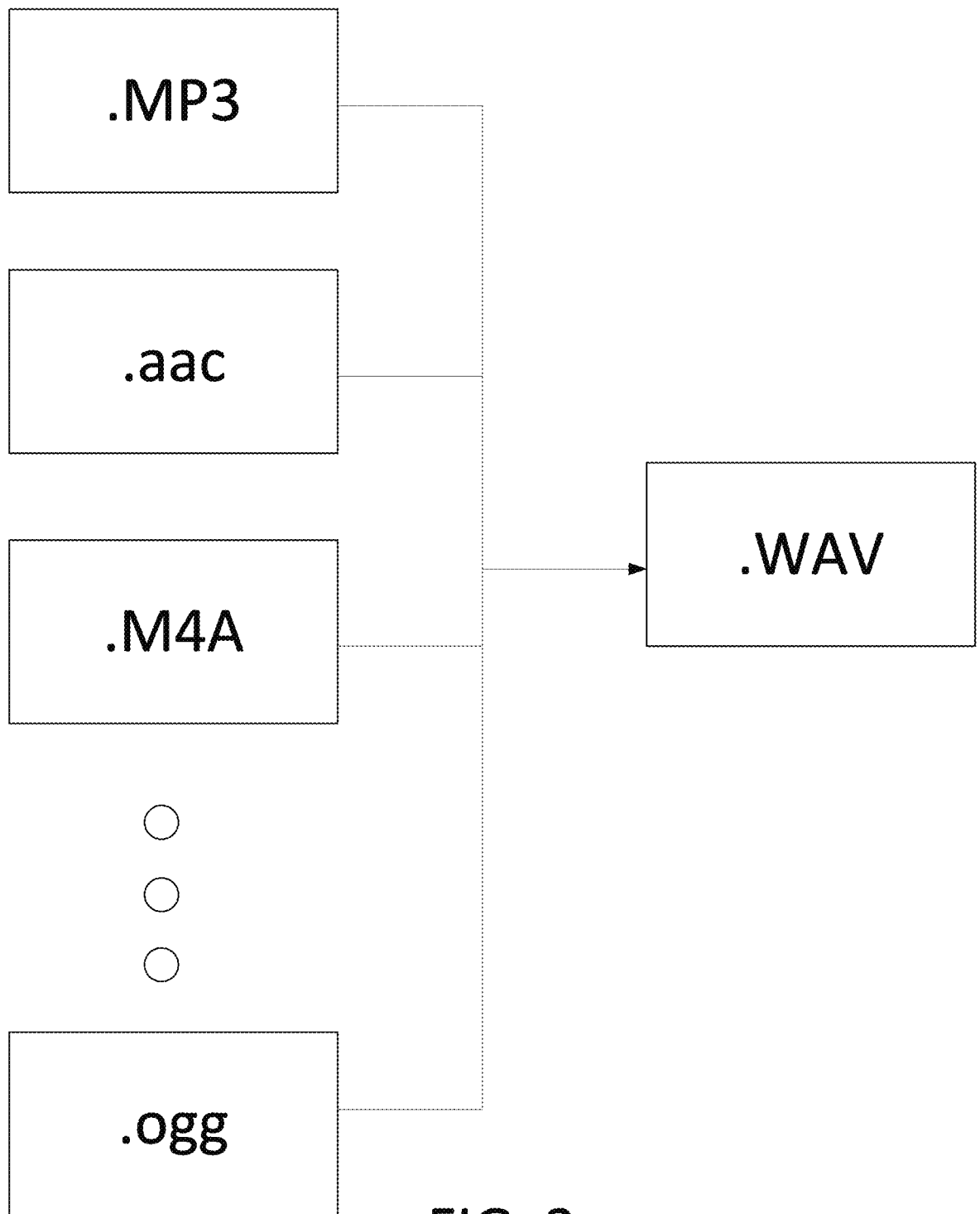
FIG. 2 illustrates exemplary types of input audio files that are converted into the .wav format.

FIG. 2 illustrates exemplary types of input audio files that can be converted into the .wav format (e.g. primary waveform). For example, audio inputs such as .MP3, .aac, .M4A, and .ogg can all be converted into the .wav format.

In some aspects, the .wav format will be used in connection with the identification of musical artifacts within the musical composition. It should be noted that there may be other types of audio input files other than as .MP3, .aac, .M4A, and .ogg that could also be used and converted into the .wav format. Furthermore, a different format besides .wav could also be used. Additionally, other digital file formats may be used, without departing from the scope of the disclosed technology.

Figure 3:
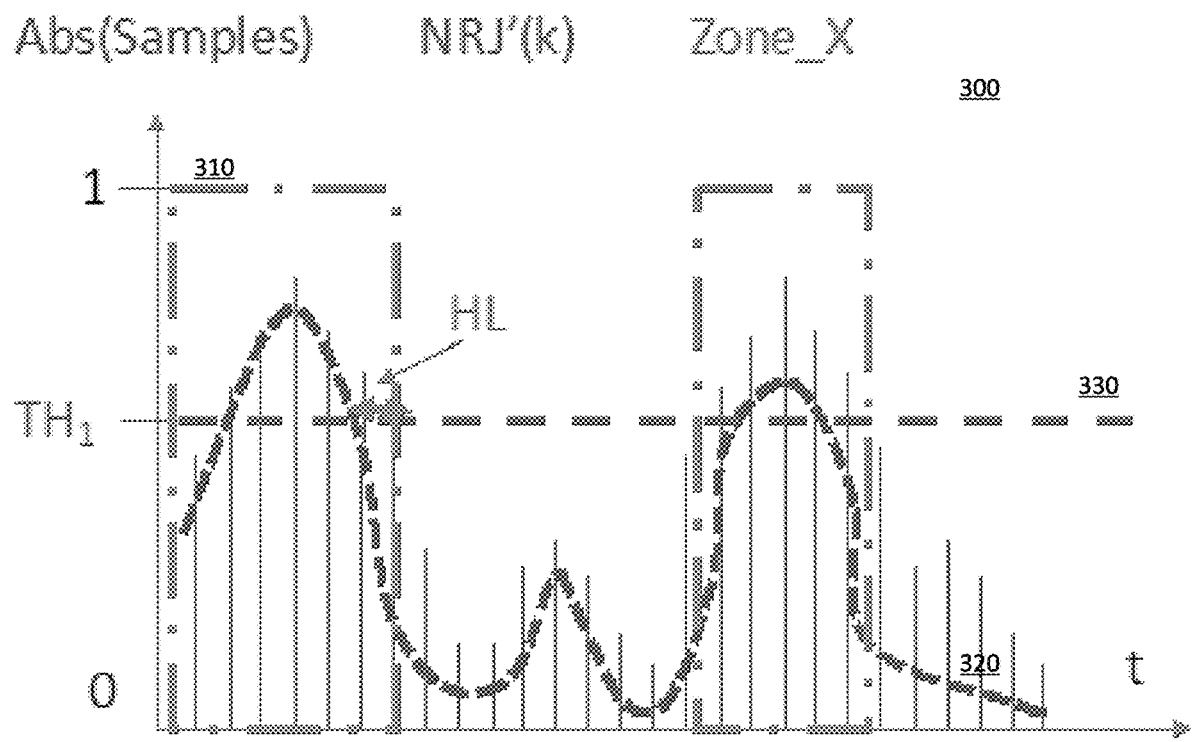
FIG. 3 conceptually illustrates an example identification of musical artifacts within a musical composition based on energy.

FIG. 3 conceptually illustrates an example identification of musical artifacts within a musical composition based on energy. In particular, the figure illustrates a graph 300 that includes an application of a symmetric square window 310 that can be used to detect potential musical artifacts within the musical composition based on the average energy of an audio signal 320. The energy, as illustrated in the figure, is defined according to the following formula:

$$NRJ(k)=\Sigma_k ABS(xi)$$

where, "k" corresponds to a number of samples' module and "ABS( )" corresponds to the absolute value function of the energy of the musical composition.

As illustrated in FIG. 3, the absolute value of the energy associated with the musical composition is shown over a period of time. A square window 310 is used to identify the portions of the musical composition where the average energy is above a pre-determined threshold (THi) 330 for a period of time (corresponding to a pre-determined number of samples or samples' module). In this way the square window is used to identify the points in time within the musical composition where musical artifacts may be located. These points in time are referred to as "Zone-X."

It should be noted that the pre-determined threshold (THi) 330 may be initially set at a default value but can also be user defined. The customization of the pre-determined threshold (THi) 330 allows the present technology to take into account different characteristics of the possible musical artifacts found within the musical composition and allow users to specifically identify which musical artifacts to detect.

Because the square window 310 takes into account multiple samples (or samples' module) when identifying whether a musical artifact is present within the musical composition, a threshold peak picking process is performed in order to identify the sample (or sample's module) with the most/highest peak to represent that musical artifact at that time point.

Figure 4:
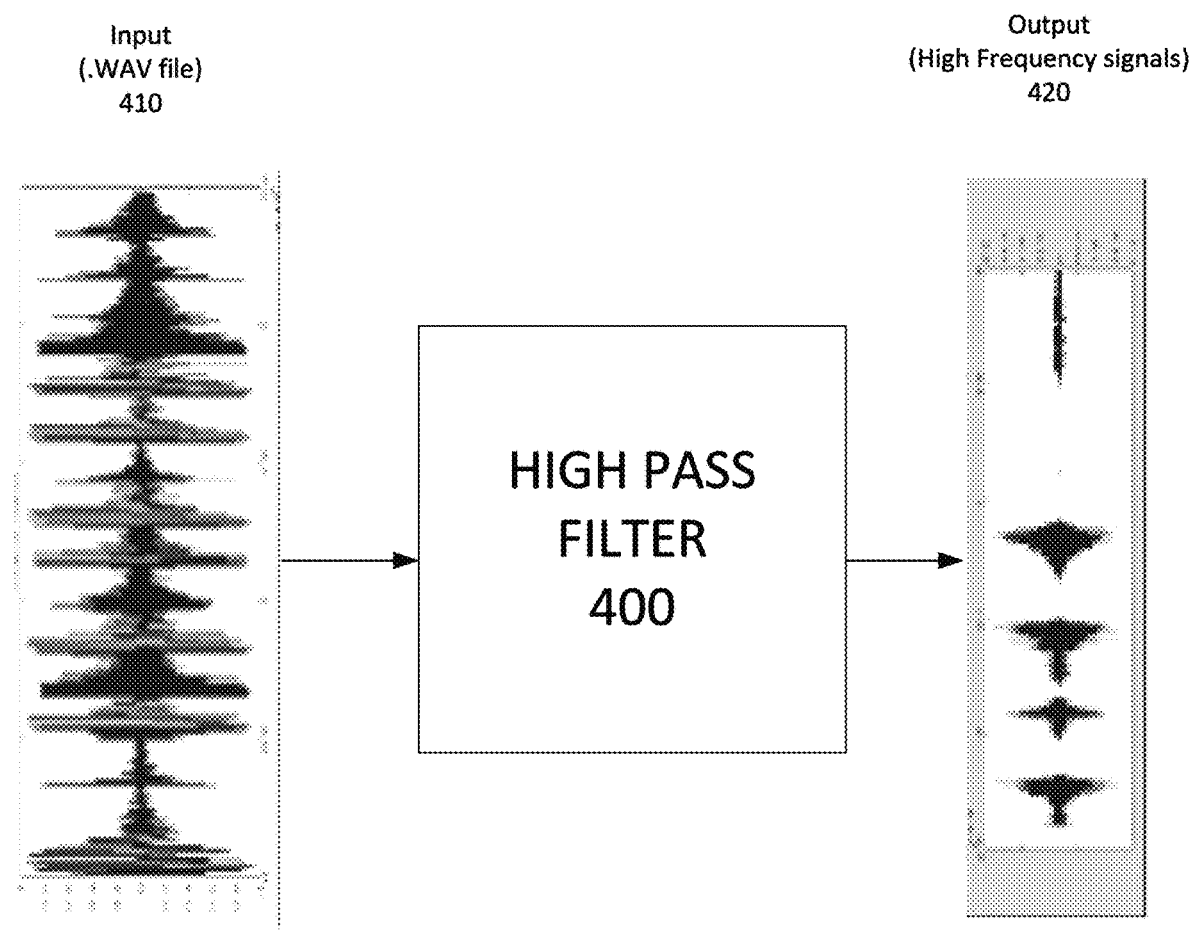
FIG. 4 illustrates an example application of a high-pass filter to detect high normalized energy in an audio input.

FIG. 4 illustrates an example application of a high-pass filter to detect high normalized energy in an audio input (or primary waveform). High pass filters are useful in detecting musical artifacts within a musical composition. As described above in FIG. 1, musical artifacts have energy at high frequency ranges. By using a high pass filter 400, a musical composition 410 can be filtered to output only the high frequency parts 420 (quaternary waveform). The high frequency parts 420 would then correspond to the points in time of the musical composition that have the requisite energy at high frequency ranges (see FIG. 1, high frequency range 130). In this way, the high pass filter 400 can be used to identify the initial determinations (or "gates") identifying where potential musical articles may be detected within the musical composition (also referred to as "zone_o".

Figure 5:
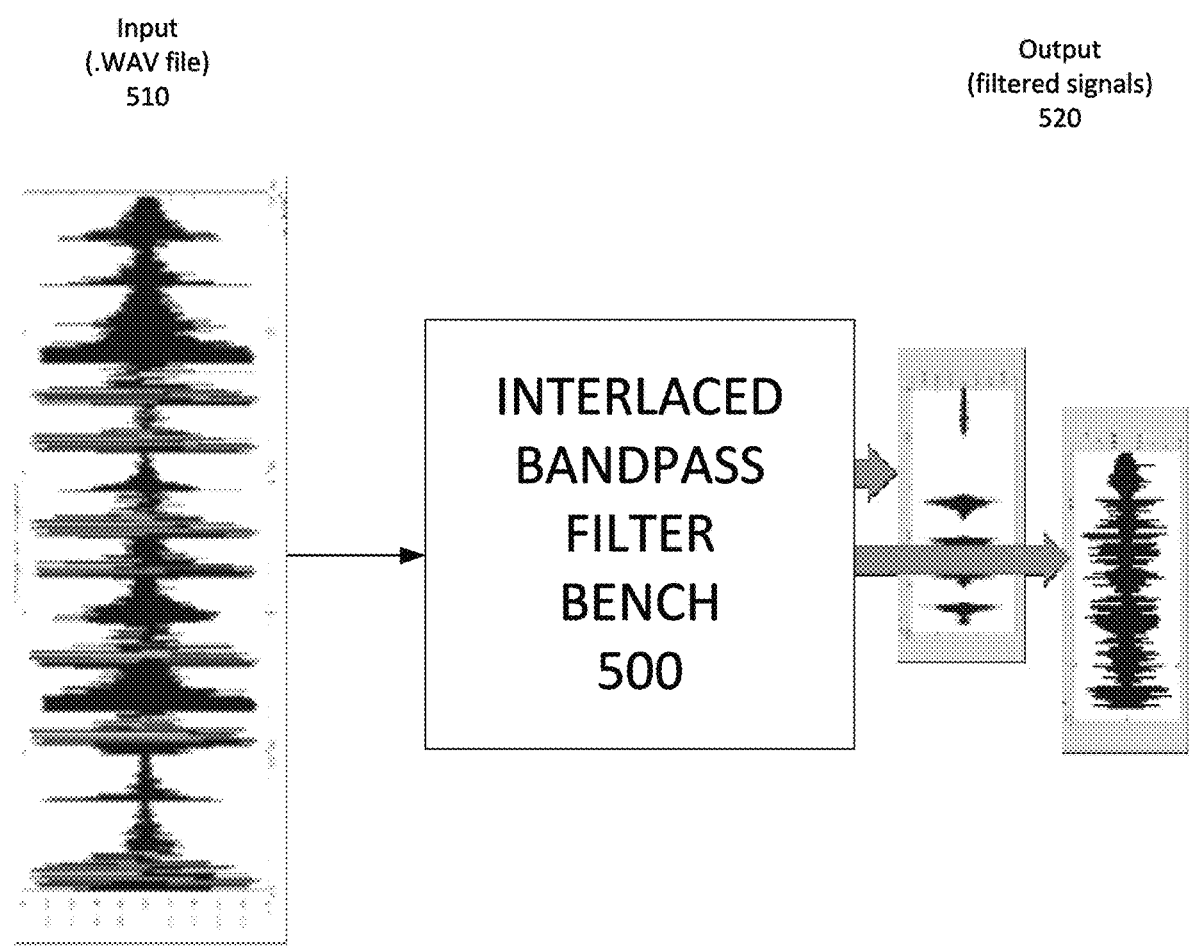
FIG. 5 illustrates an example application of a band pass filter to detect specific musical artifacts.

FIG. 5 illustrates an example application of a band pass filter 500 (or possibly two or more interlaced band pass filters) to detect specific musical artifacts. One or more band pass filters 500 (e.g. a bench of interlaced band pass filters) can be used to remove high and low frequency components of a musical composition 510 by passing frequencies within a certain frequency range (e.g. frequency band) and rejecting or attenuating frequencies outside of the frequency range. Depending on the type of musical artifact being detected (e.g. drum beat), a corresponding band pass filter 500 can be designed to filter the musical composition to only provide an output corresponding to frequencies associated with that type of musical artifact.

As discussed earlier in FIG. 1, different musical artifacts have peak energy concentrated around different frequency ranges. For example, a kick may be associated with a frequency range between 40 Hz and 100 Hz. In contrast, a snare drum may be associated with a frequency range between 120 Hz-170 Hz. Other frequency ranges may be possible for other detectable types of musical artifacts. In any case, a corresponding band pass filter 500 can be designed for the frequency range that is associated with the type of musical artifact to be detected. The output 520 (after the filtering of the musical composition 510 by the band pass filters 500—also referred to interlaced band pass filters) will be used to identify portions of the musical composition 510 that correspond to where the specific musical artifact is located. The output 520 can also be referred to as secondary waveforms.

For example, one band pass filter may be designed to specifically filter the musical composition 510 for frequencies between 40 Hz and 100 Hz. The output 520 will illustrate the portions of the musical composition where the kicks are detected. In particular, the output 520 (after filtering the musical composition 510 using the band pass filter 500) will identify the time locations within the musical compositions where energy is concentrated between the frequency range of 40 Hz and 100 Hz.

Figure 6A:
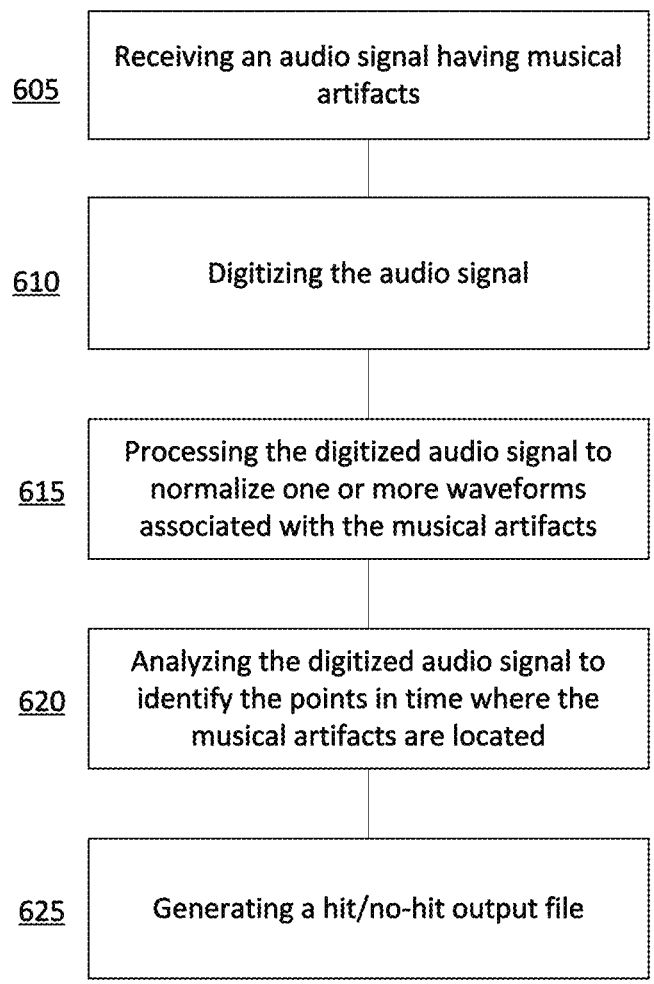
FIG. 6A illustrates an example method for detecting musical artifacts in a musical composition.

FIG. 6A illustrates an example method 600 for detecting musical artifacts in a musical composition. The method 600 is used to analyze a musical composition in order to identify the time locations within the musical composition where the musical artifacts are located.

In step 605, an audio signal representing a musical composition is received. The musical composition has an unknown number of musical artifacts that are to be identified. As discussed above, the musical artifacts correspond to different identifiable characteristics of the musical composition. Some exemplary musical artifacts include drum beats (e.g. kicks, snare drums), however, other types of artifacts may also be detected using the method 600, without departing from the disclosed technology.

After the audio signal of the musical composition is received, the audio signal is then digitized in order to generate a digital version of the audio file in step 610 (also referred to as a primary waveform). The digitized version of the musical composition is provided in a format (e.g. .wav) that can be further processed and analyzed.

In step 615, the digitized audio signal is further processed. In particular, the digitized audio signal is processed so that waveforms associated with the musical artifacts can be normalized. In an example normalization process, the peaks associated with the digitized audio signal are normalized between [−1 and 1]. Other normalization boundaries are contemplated and can be implemented in connection with the present technology, without departing from the scope of the disclosed technology.

Once the digitized audio signal has been normalized, the audio signal can then be analyzed in step 620 in order to identify the musical artifacts in step 620. The analysis of the audio signal may include a variety of different filtering processes. Furthermore, a density of the musical artifacts detected for a period of time within the musical composition determined.

The location in time within the musical composition of where the musical artifacts are located as well as the type of musical artifact located at that location can be determined. The identification of the musical artifacts in step 620 may include a number of different steps (described above in FIG. 3-5). For example, musical artifacts are detected within the musical composition when a signal has: 1) an energy that is above a first pre-determined threshold corresponding with high frequencies; an 2) average energy for a period of time that is above a second pre-determined threshold, and 3) a resonating frequency at pre-determined thresholds corresponding where most of the energy is concentrated.

Based on the outcome of the above analysis, the determination of what musical artifacts are detected and where the musical artifacts are located within the musical composition can be made. The identification of the specific musical artifacts (e.g. drum beats) and their location within the musical composition will be used with U.S. provisional application 62/837,122 (which is incorporated herein by reference) to automate a process of audio-video editing.

Based on the different musical artifacts detected, a next calculation can be performed that identifies musical artifact density for different portions of the musical composition. In particular, a musical artifact density corresponds to the number of different musical artifacts that are present within a pre-determined period of time. For example, an introductory period (e.g. 5 seconds) to the musical composition may have two different detected musical artifacts. However, during a later portion of the same musical composition, more musical artifacts (e.g. 15) may be detected within the same span of 5 seconds. The period of time used to evaluate musical artifact density can be customized by the user. For example, users may take into account characteristics of the musical composition when selecting how long the portions of the musical composition the density will be calculated.

In calculating the musical artifact density, characterizations and comparisons can be made identifying the number of musical artifacts that are detected from one portion of the musical composition to a different portion of the same musical composition. Comparisons can also be made based on portions of different musical compositions. Generally, the higher density that is detected within a portion of a musical composition, the more musical artifacts will be detected within the period of time.

In step 625, a hit/no-hit output file can be generated based on the musical artifact density calculations performed in step 620. The hit/no-hit output file can be used to identify portions of the musical compositions where a minimum density (e.g. number of musical artifacts per period of time) threshold of musical artifacts is detected. The portions of the musical compositions that have a greater number of musical artifacts than the pre-determined minimum density are labeled as "hit" sections while the portions of the musical composition that do not have the requisite minimum density of musical artifacts are labeled as "no-hit" sections. It should be noted that users are able to customize the minimum number of artifacts during a period of time (e.g. threshold density) that would be used to characterize portions of the musical composition as "hit" or "no-hit" sections.

The hit/no-hit output file can be used to inform when sections of a musical composition have a requisite number of musical artifacts (or have a pre-determined musical artifact density). When used in connection with an automated process for audio-video editing (such as described in U.S. provisional application 62/837,122 incorporated herein by reference), a computing device can be instructed to skip portions of the musical composition which are classified as "no-hit." This allows the computing device to be more efficient in the editing of audio-video by skipping portions where no edits will be performed. Meanwhile, when a portion of a musical composition has a "hit" section, this would correspond to opportunities where edits can be made to the video based on the corresponding portion of the musical composition.

Figure 6B:
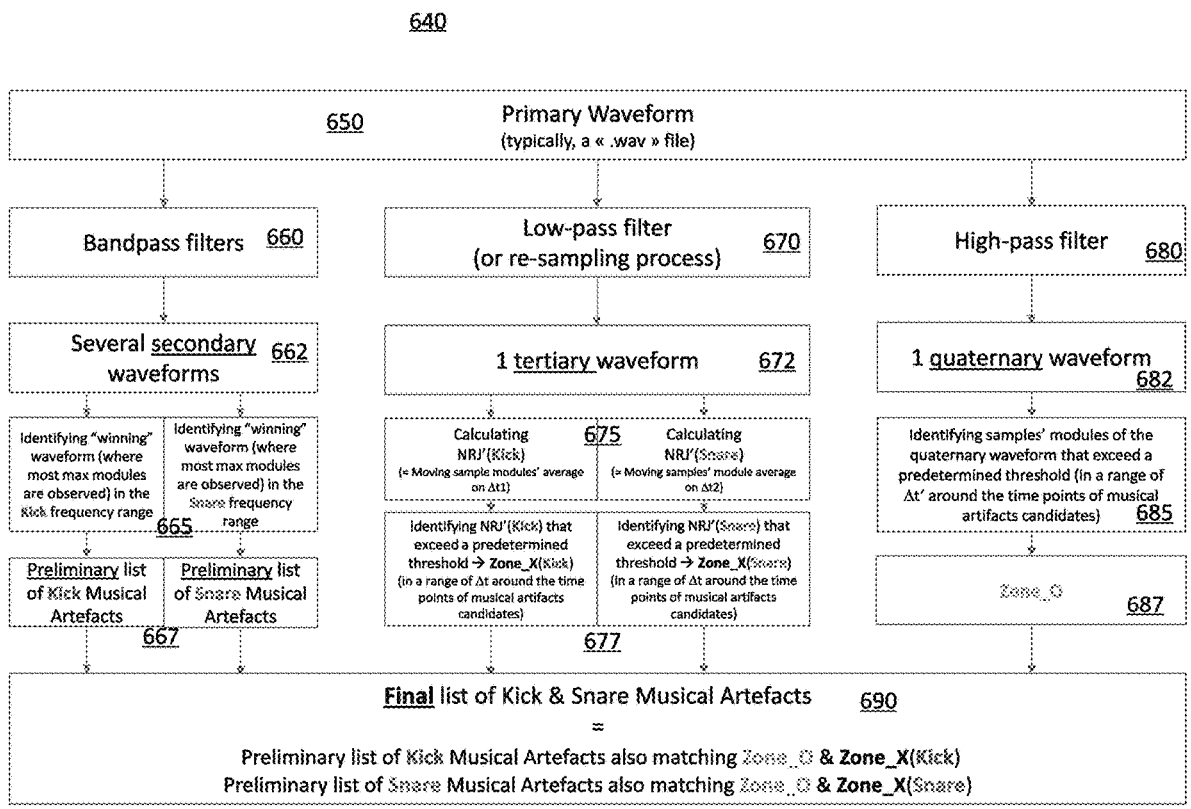
FIG. 6B illustrates another example method for detecting musical artifacts in a musical composition.

FIG. 6B illustrates another example method 640 for detecting musical artifacts in a musical composition. In particular, the method 640 starts with the receipt of a primary waveform in step 650 that will be used to identify what musical artifacts are located within a musical composition. The primary waveform (which is typically a .wav file but can be other types of files) is representative of a musical composition but has been processed into a format that can be filtered and analyzed.

Once the primary waveform has been received in step 650, a number of different filtering processes are performed. A first filtering is performed in steps 660-667. The first filtering includes the use of band pass filters in step 660 that generate different secondary waveforms 662 (associated with different frequency ranges) based on the type of band pass filters used in step 660. From the secondary waveforms, a peak-picking process is performed in step 665 where the highest/most/winning samples having the highest peak are selected for each of the different musical artifacts within the different frequency ranges. These selected samples are compiled onto a preliminary list of musical artifacts in step 667. The preliminary list will be used to compare with the time points of musical artifacts located in later filtering steps (see steps 677 and steps 687) in order to create a final list of musical artifacts (in step 690) that correspond to actual musical artifacts that are detected within the musical composition.

A second filtering process is also performed on the primary waveform in steps 670-677. The second filtering process uses a low pass filter (or re-sampling process) in step 670 in order to generate one tertiary waveform in step 672. Based on the tertiary waveform, the average energy is calculated in step 675. In step 677, indications of possible musical artifacts are identified (and stored within a secondary list) based on the detection of the tertiary waveform exceeding a predetermined threshold. These indications of possible musical artifacts (also referred to as Zone-X) are located within a range of where the musical artifacts identified in the preliminary list are located.

A third filtering process is also performed on the primary waveform in steps 680-687. The third filtering process uses a high pass filter in step 680 in order to generate one quaternary waveform in step 682. Based on the quaternary waveform, different samples' modules are identified that exceed a predetermined threshold in step 685. These samples' modules are also identified within a range of time with respect to where the musical artifacts identified in the preliminary list are located. The samples' modules are then categorized as "zone-o" in step 687. Zone-O represents another possible indication that musical artifacts are present within the musical composition. These possible indications (related to Zone-O) are stored in a third list that can be referred to later.

Once the different filtering steps have been performed, the preliminary list of musical artifacts (created in step 667) is compared with the list of possible musical artifacts (created in steps 677 and step 687) in order to confirm a final list of musical artifacts in step 690. In particular, the final list of musical artifacts will correspond to the points in time where the indications of possible musical artifacts (e.g. zone_o and zone_x) match. This correlates with the discussion above where musical artifacts have 1) an energy that is above a first pre-determined threshold corresponding with high frequencies (detected via the high-pass filtering process); an 2) average energy for a period of time that is above a second pre-determined threshold (detected via the low-pass filtering or re-sampling process), and 3) a resonating frequency at pre-determined thresholds corresponding where most of the energy is concentrated (detected via the band pass filters).

Figure 7:
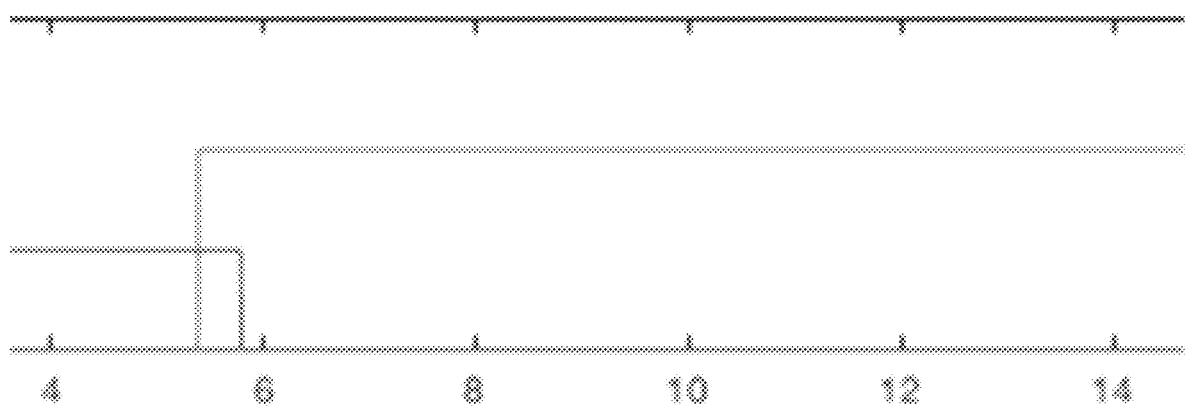
FIG. 7 illustrates an example hit/no-hit output file of a musical composition.

FIG. 7 illustrates an example hit/no-hit output file of a musical composition. The difference between "HIT" and "NO-HIT" sections found within the musical composition can be represented by their respective overall energy levels as depicted in the figure. The lower graph would correspond with "NO-HIT" sections of the musical composition whereas "HIT" sections of the musical composition would have a higher amount of energy corresponding to the higher graph. It may also be possible to represent "HIT" and "NO-HIT" sections as a vector.

Figure 8:
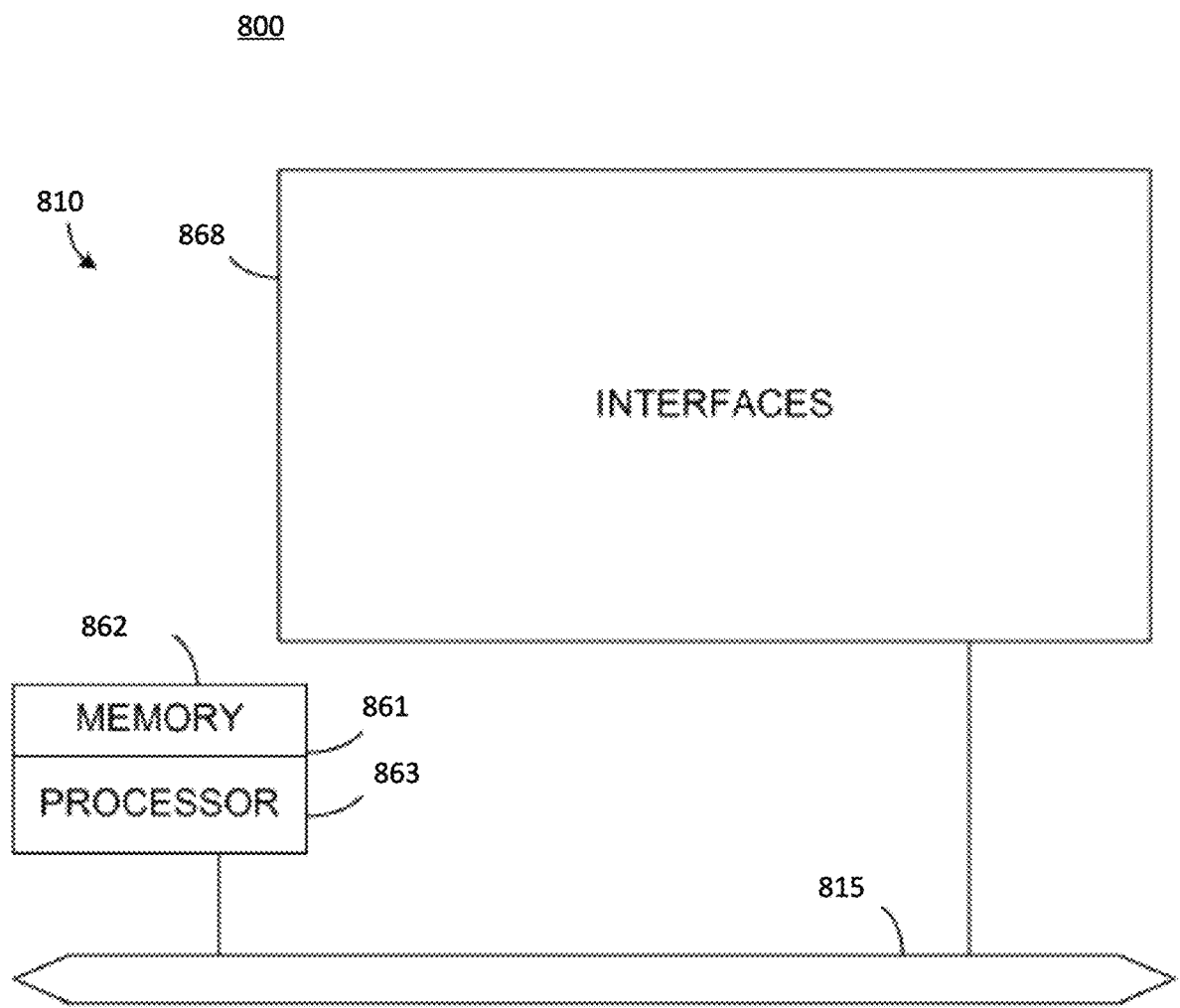
FIG. 8 illustrates an example processor-based computing device used to implement the various aspects of the present technology.

FIG. 8 illustrates an example processor-based computing device 800 used to implement the various aspects of the present technology.

For example, processor-based computing device 800 may be used to implement a video editing device that is configured to mix and beat match audio and video inputs. It is further understood that processor-based computing device 800 may be used in conjunction with one or more other processor-based devices, for example, as part of a computer network or computing cluster.

Processor-based computing device 800 includes a master central processing unit (CPU) 862, interfaces 868, and a bus 815 (e.g., a PCI bus). CPU 862 preferably accomplishes all these functions under the control of software including an operating system and any appropriate applications software. CPU 862 can include one or more processors 863 such as a processor from the Motorola family of microprocessors or the MIPS family of microprocessors. In an alternative embodiment, processor 1063 is specially designed hardware for controlling the operations of processor-based computing device 800. In a specific embodiment, a memory 861 (such as non-volatile RAM and/or ROM) also forms part of CPU 862. However, there are many different ways in which memory could be coupled to the system.

Interfaces 868 can be provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 862 to efficiently perform routing computations, network diagnostics, security functions, etc.

Although the system shown in FIG. 8 is one specific network device of the present invention, it is by no means the only device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 861) configured to store program instructions for general-purpose network operations and mechanisms. The program instructions may control the operation of an operating system and/or one or more applications, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Statements of the Disclosure Include:

A computer-implemented method for identifying musical artifacts can include receiving a primary waveform representing a musical composition, wherein the musical composition can include a plurality of musical artifacts, filtering the primary waveform to generate alternative waveforms associated with the plurality of musical artifacts, and automatically analyzing the alternative waveforms to identify time points in the primary waveform that correspond with the plurality of musical artifacts.

Additionally, the filtering of the primary waveform can include a first filtering process using two or more interlaced band pass filters that outputs two or more secondary waveforms, and wherein the first filtering process can include a) calculating samples' module of the two or more secondary waveforms, b) identifying the samples' module that exceeds a first predetermined frequency range threshold, wherein each of the musical artifacts has a different frequency range threshold, c) identifying frequency ranges for each of the musical artifacts which one of the two or more secondary waveforms is featuring a most samples' module exceeding the first predetermined frequency range threshold, and d) identifying a preliminary list of the musical artifacts based on the samples' module of the two or more secondary waveforms featuring the most samples' module exceeding the first predetermined frequency range threshold for each of the musical artifacts.

Additionally, the filtering of the primary waveform can include a second filtering process of the primary waveform using either low-pass filter or a resampling process, wherein the second filtering outputs a tertiary waveform, and wherein the second filtering process can include a) calculating a tertiary waveform samples' module moving average for each musical artifact frequency range and identifying for each of the musical artifacts at least one of samples' module moving average that exceeds a second predetermined frequency range threshold, and b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of □t with respect to the time points of the musical artifacts included on the preliminary list.

Additionally, the filtering of the primary waveform can include performing a third filtering of the primary waveform using a high-pass filter, wherein the third filtering outputs a quaternary waveform, and wherein the third filtering can include a) identifying samples' modules of the quaternary waveform that exceed a third predetermined second frequency range threshold, and b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of □t with respect to the time points of the musical artifacts included on the secondary list.

Additionally, the automatically analyzing of the alternative waveforms further can include identifying song sections in the primary waveform representing the musical composition that have a number of musical artifacts that exceeds a predetermined density threshold.

Additionally, a computer-implemented method, as disclosed above, can include generating a hit/no-hit output file that identifies the song sections in the primary waveform that contain the number of musical artifacts that exceeds the predetermined density threshold.

Additionally, the plurality of musical artifacts can include one or more of kicks and snare drums.

A non-transitory computer-readable medium can include instructions that identifies musical artifacts, the instructions, when executed by a computing system, cause the computing system to: receive a primary waveform representing a musical composition, wherein the musical composition includes a plurality of musical artifacts, filter the primary waveform to generate alternative waveforms associated with the plurality of musical artifacts, and automatically analyze the alternative waveforms to identify time points in the primary waveform that correspond with the plurality of musical artifacts.

Additionally, the instructions for the filtering of the primary waveform can further include performing a first filtering process using two or more interlaced band pass filters that outputs two or more secondary waveforms, and wherein the first filtering process includes a) calculating samples' module of the two or more secondary waveforms, b) identifying the samples' module that exceeds a first predetermined frequency range threshold, wherein each of the musical artifacts has a different frequency range threshold, c) identifying frequency ranges for each of the musical artifacts which one of the two or more secondary waveforms is featuring a most samples' module exceeding the first predetermined frequency range threshold, and d) identifying a preliminary list of the musical artifacts based on the samples' module of the two or more secondary waveforms featuring the most samples' module exceeding the first predetermined frequency range threshold for each of the musical artifacts.

Additionally, the instructions for the filtering of the primary waveform further comprises can include performing a second filtering process of the primary waveform using either low-pass filter or a resampling process, wherein the second filtering outputs a tertiary waveform, and wherein the second filtering process can include a) calculating a tertiary waveform samples' module moving average for each musical artifact frequency range and identifying for each of the musical artifacts at least one of samples' module moving average that exceeds a second predetermined frequency range threshold, and b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of □t with respect to the time points of the musical artifacts included on the preliminary list Additionally, the instructions for the filtering of the primary waveform further can include performing a third filtering process of the primary waveform using a high-pass filter, wherein the third filtering outputs a quaternary waveform, and wherein the third filtering includes a) identifying samples' modules of the quaternary waveform that exceed a third predetermined second frequency range threshold, and b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of □t with respect to the time points of the musical artifacts included on the secondary list.

Additionally, the instructions for the automatically analyzing the alternative waveforms can include identifying song sections in the primary waveform representing the musical composition that have a number of musical artifacts that exceeds a predetermined density threshold.

Additionally, the instructions for identifying musical artifacts can include generating a hit/no-hit output file that identifies the song sections in the primary waveform that contain the number of musical artifacts that exceeds the predetermined density threshold.

Additionally, the plurality of musical artifacts can include one or more of kicks and snare drums.

A system for identifying musical artifacts can include a processor, and a non-transitory computer-readable medium storing instructions that, when executed by the system, cause the system to: receive a primary waveform representing a musical composition, wherein the musical composition includes a plurality of musical artifacts, filter the primary waveform to generate alternative waveforms associated with the plurality of musical artifacts, and automatically analyze the alternative waveforms to identify time points in the primary waveform that correspond with the plurality of musical artifacts Additionally, the instructions for the filtering of the primary waveform further includes performing a first filtering process using two or more interlaced band pass filters that outputs two or more secondary waveforms, and wherein the first filtering process includes a) calculating samples' module of the two or more secondary waveforms, b) identifying the samples' module that exceeds a first predetermined frequency range threshold, wherein each of the musical artifacts has a different frequency range threshold, c) identifying frequency ranges for each of the musical artifacts which one of the two or more secondary waveforms is featuring a most samples' module exceeding the first predetermined frequency range threshold, and d) identifying a preliminary list of the musical artifacts based on the samples' module of the two or more secondary waveforms featuring the most samples' module exceeding the first predetermined frequency range threshold for each of the musical artifacts.

Additionally, the instructions for the filtering of the primary waveform further includes performing a second filtering process of the primary waveform using either low-pass filter or a resampling process, wherein the second filtering outputs a tertiary waveform, and wherein the second filtering process further includes a) calculating a tertiary waveform samples' module moving average for each musical artifact frequency range and identifying for each of the musical artifacts at least one of samples' module moving average that exceeds a second predetermined frequency range threshold, and b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of □t with respect to the time points of the musical artifacts included on the preliminary list.

Additionally, the instructions for the filtering of the primary waveform further includes performing a third filtering process of the primary waveform using a high-pass filter, wherein the third filtering outputs a quaternary waveform, and wherein the third filtering includes a) identifying samples' modules of the quaternary waveform that exceed a third predetermined second frequency range threshold, and b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of ☐t with respect to the time points of the musical artifacts included on the secondary list.

Additionally, the instructions for the automatically analyzing the alternative waveforms further includes identifying song sections in the primary waveform representing the musical composition that have a number of musical artifacts that exceeds a predetermined density threshold.

Additionally, the instructions for identifying musical artifacts further includes generating a hit/no-hit output file that identifies the song sections in the primary waveform that contain the number of musical artifacts that exceeds the predetermined density threshold.

Additionally, the plurality of musical artifacts includes one or more of kicks and snare drums.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for identifying musical artifacts, the method comprising:
   receiving a primary waveform representing a musical composition, wherein the musical composition comprises a plurality of musical artifacts;
   filtering the primary waveform to generate alternative waveforms associated with the plurality of musical artifacts, wherein the filtering of the primary waveform comprises a first filtering process using two or more interlaced band pass filters that outputs two or more secondary waveforms, and wherein the first filtering process comprises:
   a) calculating samples' module of the two or more secondary waveforms,
   b) identifying the samples' module that exceeds a first predetermined frequency range threshold, wherein each of the musical artifacts has a different frequency range threshold,
   c) identifying frequency ranges for each of the musical artifacts which one of the two or more secondary waveforms is featuring a most samples' module exceeding the first predetermined frequency range threshold, and
   d) identifying a preliminary list of the musical artifacts based on the samples' module of the two or more secondary waveforms featuring the most samples' module exceeding the first predetermined frequency range threshold for each of the musical artifacts; and
   automatically analyzing the alternative waveforms to identify time points in the primary waveform that correspond with the plurality of musical artifacts.

2. The computer-implemented method of claim 1, wherein the filtering of the primary waveform further comprises a second filtering process of the primary waveform using either low-pass filter or a resampling process, wherein the second filtering outputs a tertiary waveform, and wherein the second filtering process further comprises:
   a) calculating a tertiary waveform samples' module moving average for each musical artifact frequency range and identifying for each of the musical artifacts at least one of samples' module moving average that exceeds a second predetermined frequency range threshold, and
   b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of t with respect to the time points of the musical artifacts included on the preliminary list.

3. The computer-implemented method of claim 2, wherein the filtering of the primary waveform further comprises performing a third filtering of the primary waveform using a high-pass filter, wherein the third filtering outputs a quaternary waveform, and wherein the third filtering comprises:
   a) identifying samples' modules of the quaternary waveform that exceed a third predetermined second frequency range threshold, and
   b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of t with respect to the time points of the musical artifacts included on the secondary list.

4. The computer-implemented method of claim 1, wherein the automatically analyzing of the alternative waveforms further comprises identifying song sections in the primary waveform representing the musical composition that have a number of musical artifacts that exceeds a predetermined density threshold.

5. The computer-implemented method of claim 4, further comprising generating a hit/no-hit output file that identifies the song sections in the primary waveform that contain the number of musical artifacts that exceeds the predetermined density threshold.

6. The computer-implemented method of claim 1, wherein the plurality of musical artifacts comprises one or more of kicks and snare drums.

7. A non-transitory computer-readable medium comprising instructions that identifies musical artifacts, the instructions, when executed by a computing system, cause the computing system to:
   receive a primary waveform representing a musical composition, wherein the musical composition comprises a plurality of musical artifacts;
   filter the primary waveform to generate alternative waveforms associated with the plurality of musical artifacts, wherein the instructions for the filtering of the primary waveform further comprises performing a first filtering process using two or more interlaced band pass filters that outputs two or more secondary waveforms, and wherein the first filtering process comprises:
   a) calculating samples' module of the two or more secondary waveforms,
   b) identifying the samples' module that exceeds a first predetermined frequency range threshold, wherein each of the musical artifacts has a different frequency range threshold, c) identifying frequency ranges for each of the musical artifacts which one of the two or more secondary waveforms is featuring a most samples' module exceeding the first predetermined frequency range threshold, and d) identifying a preliminary list of the musical artifacts based on the samples' module of the two or more secondary waveforms featuring the most samples' module exceeding the first predetermined frequency range threshold for each of the musical artifacts; and automatically analyze the alternative waveforms to identify time points in the primary waveform that correspond with the plurality of musical artifacts.

8. The non-transitory computer-readable medium of claim 7, wherein the instructions for the filtering of the primary waveform further comprises performing a second filtering process of the primary waveform using either low-pass filter or a resampling process, wherein the second filtering outputs a tertiary waveform, and wherein the second filtering process further comprises:

a) calculating a tertiary waveform samples' module moving average for each musical artifact frequency range and identifying for each of the musical artifacts at least one of samples' module moving average that exceeds a second predetermined frequency range threshold, and b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of t with respect to the time points of the musical artifacts included on the preliminary list.

9. The non-transitory computer-readable medium of claim 8, wherein the instructions for the filtering of the primary waveform further comprises performing a third filtering process of the primary waveform using a high-pass filter, wherein the third filtering outputs a quaternary waveform, and wherein the third filtering comprises:

a) identifying samples' modules of the quaternary waveform that exceed a third predetermined second frequency range threshold, and b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of t with respect to the time points of the musical artifacts included on the secondary list.

10. The non-transitory computer-readable medium of claim 7, wherein the instructions for the automatically analyzing the alternative waveforms further comprises identifying song sections in the primary waveform representing the musical composition that have a number of musical artifacts that exceeds a predetermined density threshold.

11. The non-transitory computer-readable medium of claim 10, wherein the instructions for identifying musical artifacts further comprises generating a hit/no-hit output file that identifies the song sections in the primary waveform that contain the number of musical artifacts that exceeds the predetermined density threshold.

12. The non-transitory computer-readable medium of claim 7, wherein the plurality of musical artifacts comprises one or more of kicks and snare drums.

13. A system for identifying musical artifacts, the system comprising:

a processor; and a non-transitory computer-readable medium storing instructions that, when executed by the system, cause the system to:

receive a primary waveform representing a musical composition, wherein the musical composition comprises a plurality of musical artifacts, filter the primary waveform to generate alternative waveforms associated with the plurality of musical artifacts, wherein the instructions for the filtering of the primary waveform further comprises performing a first filtering process using two or more interlaced band pass filters that outputs two or more secondary waveforms, and wherein the first filtering process comprises:

a) calculating samples' module of the two or more secondary waveforms, b) identifying the samples' module that exceeds a first predetermined frequency range threshold, wherein each of the musical artifacts has a different frequency range threshold, c) identifying frequency ranges for each of the musical artifacts which one of the two or more secondary waveforms is featuring a most samples' module exceeding the first predetermined frequency range threshold, and d) identifying a preliminary list of the musical artifacts based on the samples' module of the two or more secondary waveforms featuring the most samples' module exceeding the first predetermined frequency range threshold for each of the musical artifacts, and automatically analyze the alternative waveforms to identify time points in the primary waveform that correspond with the plurality of musical artifacts.

14. The system of claim 13, wherein the instructions for the filtering of the primary waveform further comprises performing a second filtering process of the primary waveform using either low-pass filter or a resampling process, wherein the second filtering outputs a tertiary waveform, and wherein the second filtering process further comprises:

a) calculating a tertiary waveform samples' module moving average for each musical artifact frequency range and identifying for each of the musical artifacts at least one of samples' module moving average that exceeds a second predetermined frequency range threshold, and b) identifying a secondary list of musical artifacts that includes musical artifacts of the preliminary list, wherein the secondary list of musical artifacts includes the musical artifacts that have the samples' module moving average exceeding the second predetermined frequency range threshold at the time points within a range of t with respect to the time points of the musical artifacts included on the preliminary list.

15. The system of claim 14, wherein the instructions for the filtering of the primary waveform further comprises performing a third filtering process of the primary waveform using a high-pass filter, wherein the third filtering outputs a quaternary waveform, and wherein the third filtering comprises:

a) identifying samples' modules of the quaternary waveform that exceed a third predetermined second frequency range threshold, and b) identifying a tertiary list of musical artifacts that includes the musical artifacts of the secondary list, wherein the tertiary list of musical artifacts includes the musical artifacts that have the samples' module of the quaternary waveform exceeding the third predetermined frequency range threshold within a range of t with respect to the time points of the musical artifacts included on the secondary list.

16. The system of claim 13, wherein the instructions for the automatically analyzing the alternative waveforms further comprises identifying song sections in the primary waveform representing the musical composition that have a number of musical artifacts that exceeds a predetermined density threshold.

17. The system of claim 16, wherein the instructions for identifying musical artifacts further comprises generating a hit/no-hit output file that identifies the song sections in the primary waveform that contain the number of musical artifacts that exceeds the predetermined density threshold.

18. The system of claim 13, wherein the plurality of musical artifacts comprises one or more of kicks and snare drums.

* * * * *